Figure 1:
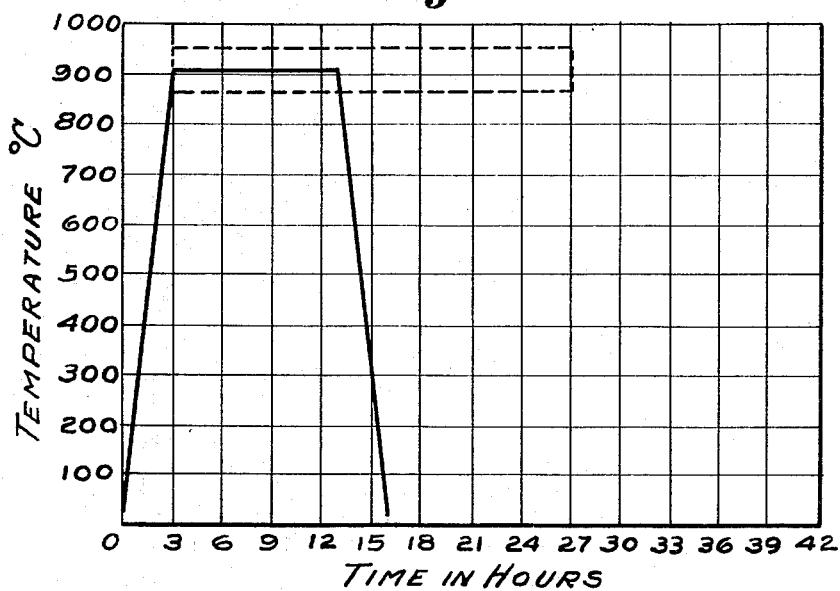

INVENTOR.
JOHN F. MacDOWELL
BY Clarence R. Patty Jr.
ATTORNEY

United States Patent Office 3,275,493
Patented Sept. 27, 1966

3,275,493
GLASS BODY HAVING SURFACE CRYSTALLINE LAYER THEREON AND METHOD OF MAKING IT
John F. MacDowell, Painted Post, N.Y., assignor to Corning Glass Works, Corning, N.Y., a corporation of New York
Filed Aug. 8, 1962, Ser. No. 215,661
6 Claims. (Cl. 161—1)

This invention relates to the manufacture of glass bodies having crystalline surface layers thereon. More specifically, this invention relates to glass bodies having a surface layer of cordierite crystals thereon.

Glasses having compositions approximating the stoichiometry of cordierite ($2MgO \cdot 2Al_2O_3 \cdot 5SiO_2$) are among the best electrical insulators known, probably because they possess a very low interstitial volume. Their very low coefficient of thermal expansion providing excellent resistance to thermal shock has also led to much research and field work in other applications such as dinnerware, regenerators, and missile components. However, one drawback which has limited the widespread use of these glasses has been their lack of high strength.

The literature is replete with references to the fact that glasses having compositions approximating the stoichiometry of cordierite, i.e., about 20.25 weight percent MgO, about 32.28 weight percent $Al_2O_3$, and about 47.47 weight percent $SiO_2$, will surface crystallize when heated at temperatures above about 900° C. A crystalline surface layer of cordierite may thus be grown upon these glasses to any desired thickness by appropriate regulation of the thermal history. The very low expansion of the cordierite crystals, when compared with the base glass, results in a compressive stress being set up in and parallel to the surface of the base glass. Such a compressive layer, as is well recognized in the ceramic art, causes the strength of the body to be substantially increased. Thus, glasses having surface compressive layers generally exhibit strengths considerably higher than untreated varieties. Unfortunately, however, these coatings grown upon cordierite glass are invariably distorted, rough-textured, and tend to spall off rapidly upon cooling to room temperature.

As glasses near the cordierite stoichiometry are heated to 850°–900° C., a surface crystallized phase appears which closely resembles mu-cordierite, a low temperature metastable phase reported by Karkhanavala and Hummel, "The Polymorphism of Cordierite," J. Am. Cer. Soc., 36, (12), 389–92 (1953). Upon further heating, a transformation occurs from mu-cordierite to the stable alpha-cordierite form. A further large specific volume change apparently accompanies this transformation, for the cordierite coatings resulting are invariably cracked and distorted.

The principal object of this invention is to manufacture glass bodies of compositions approximating the stoichiometry of cordierite having surface compressive layers of cordierite crystals thereon which are free of cracks, distortions, and spalls.

Another object of this invention is to manufacture glass bodies near the cordierite stoichiometry which exhibit excellent high strength, low thermal expansion, and good electrical insulating properties.

A still further object of this invention is to provide a method of making glass bodies of compositions approximating the stoichiometry of cordierite having sound surface compressive layers of cordierite crystals thereon which is relatively simple in operation, economical in practice, and in which presently available apparatus and known techniques can be utilized.

I have discovered that the above objects can be obtained where small, closely-controlled amounts of arsenic and/or antimony trioxides are added to glass-forming batches near the cordierite stoichiometry and the resultant glass bodies are subsequently subjected to a specific heat treatment. Microscopic evidence indicates that the function of the $As_2O_3$ and $Sb_2O_3$ in effecting good quality coatings is to prevent formation of the aforementioned metastable mu-cordierite phase. Glasses near the cordierite stoichiometry surface crystallize in situ directly to alpha-cordierite and thereby avoid the dimensionally unstable mu-alpha cordierite polymorphic transformation. I have learned that additions of 0.5–6.0% by weight total of $As_2O_3$ and/or $Sb_2O_3$, with about 2.0–4.0% being preferred, to the glass-forming batch yield smooth, uniform surface coatings of crystalline cordierite upon heat treatment.

In its most essential terms, the invention comprises the heat treating of a glass body having a batch composition consisting essentially, by weight, of about 40–57% $SiO_2$, 10–22% MgO, 30–40% $Al_2O_3$, and 0.5–6.0% total of at least one of the group of modifying oxides consisting of $As_2O_3$ and $Sb_2O_3$. A glass-forming batch containing these components is melted, simultaneously cooled and shaped into a glass body, said body thereafter being exposed to a temperature of at least 860° C., but not higher than about 950° C., for a time sufficient to attain the desired surface crystallization, generally from about 6–24 hours, after which it is cooled to room temperature.

I have further found that, although the presence of $As_2O_3$ and/or $Sb_2O_3$ in such glasses permits the production of smooth surface layers of cordierite crystals, more uniform control of this crystallization is provided when one or more of the following oxides is also present: potassium oxide ($K_2O$), rubidium oxide ($Rb_2O$), cesium oxide ($Cs_2O$), lead oxide (PbO), calcium oxide (CaO), bismuth sesquioxide ($Bi_2O_3$), and tantalum pentoxide ($Ta_2O_5$). Therefore, I prefer to also include up to about 6.0% by weight total of at least one of these supplemental oxides in the batch.

In the following examples, the batch materials were ball milled in order to obtain more efficient melting and better glass homogeneity and the melted at about 1600° C. for 4–16 hours in crucibles, pots, or tanks depending upon the size of the melt desired. The melts were stirred to assure best glass quality. The molten batch was poured into steel molds and transferred to an annealing furnace operating at 850° C., wherein the shapes were cooled as a glass to room temperature. The glass shapes were thereafter placed in a furnace, heated at about 5° C./minute to 890°–930° C., and maintained thereat for 10–12 hours to attain the desired crystalline surface layer. The glass shapes encased within the surface compressive layers were then cooled to room temperature.

It will be understood that the above-mentioned heating schedule was chosen to protect the glass shapes from thermal shock and deformation. The tendency to break or shatter due to thermal shock is generally founded upon two factors: (1) the thermal coefficient of expansion of the material and (2) the size and shape of the body involved. The low thermal coefficient of expansion of cordierite glasses allows relatively rapid changes in temperature without fear of breakage or spalling due to thermal shock, and heating rates much faster than 5° C./minute could be utilized if resistance to thermal shock were the sole criterion, particularly where small shapes are involved. However, a more vital factor limiting the rate of heat-up concerns deformation of the body.

In many instances, the glass bodies are cooled to room temperature before being subjected to the critical heat treatment for forming the surface coatings of cordierite crystals. This permits visual inspection of each item. Nevertheless, where speed of operation and economies in the use of heat are desired, the glass bodies may be cooled merely to just below the transformation point, i.e., the temperature at which the liquid melt is deemed to have become an amorphous solid, this temperature generally being in the vicinity of the annealing point of the glass (about 770°–800° C. for the glasses herein) and the required heat treating procedure thereafter carried out. In any event, the glass body must be cooled below this transformation point before the reheating step is initialed in order to insure the formation of the desired crystalline surface layer.

When a glasss shape is heated above the transformation point, softening of the body occurs and deformation can take place. With the present glasses, surface crystallization commences as the body is heated to temperatures above the transformation point. This crystallization proceeds more rapidly as the temperature approaches the liquidus of the crystal phase. The softening point and, hence, the deformation temperature of the crystal layer are considerably higher than the base glass. However, as crystallization begins, the proportion of crystals to glassy matrix is very small and the article will not retain its shape should the temperature be increased too rapidly. Therefore, the rate of heating of the glass body must be in substantial balance with the rate at which crystals are being formed, or deformation due to a lowering of the viscosity of the body will render the final product generally of little use. Thus, although higher heating rates have yielded satisfactory cordierite-encased glasses, I prefer a rate of about 5° C./min. From the foregoing explanation, it will be obvious that an increase in temperature of less than the rate specified will likewise provide a glass body having the desired crystalline surface layer. Experience has shown the rate of crystallization of the cordierite surface layer is quite slow where $As_2O_3$ and/or $Sb_2O_3$ are added alone to the glass composition and greater care must be exercised to avoid deformation of the glass body during the heat treating step. The presence of the supplemental oxides noted above substantially increases the rate of crystallization and this feature provides another reason why the addition of these oxides to the batch is preferred.

The cooling rate to room temperature is determined solely upon the resistance to thermal shock of the bodies. The coefficients of thermal expansion of the cordierite-encased glasses of this invention are relatively low so cooling can be quite rapid. The heat to the furnace may be merely cut off and the furnace allowed to cool at its own rate. Small bodies can be safely removed from the furnace and cooled in air. However, a cooling rate of about 5° C./minute is often employed to eliminate any danger of thermal breakage.

The method of my invention, then, comprises three steps: (1) melting the glass-forming batch; (2) cooling the melt below its transformation point to a glass body; and (3) heat treating the glass body at a temperature of at least about 860° C., but not above about 950° C., for a time sufficient to attain the desired crystallization.

I have found the above cited narrow ranges of components to be critical to the invention. In order to retain the physical properties of a glass having the stoichiometry of cordierite, the quantities of MgO, $Al_2O_3$, and $SiO_2$ must be held relatively close to the theoretical $$2MgO \cdot 2Al_2O_3 \cdot 5SiO_2$$

Further, ternary compositions falling outside the limits set out are wrinkled, spalled, rough-textured or otherwise imperfect after the heat treating step even when the modifying ingredients are present. The compositional ranges for the modifying and supplemental agents cited above denote the limits within which defect-free, cordierite-encased glasses can be made. Best results were obtained using about 2–4% by weight of each group.

Table I records examples produced in accordance with the teachings of my invention. These have compositions falling within the required ranges calculated from their respective batches on the oxide basis in weight percent, exclusive of impurities which may be present in the batch. The batch may comprise any materials, either oxides or other compounds, which, on being melted together are converted to the desired oxide compositions in the required proportions.

TABLE I

|  | 1 | 2 | 3 | 4 | 5 | 6 | 7 | 8 |
|---|---|---|---|---|---|---|---|---|
| $SiO_2$ | 49.5 | 47.2 | 47.2 | 47.2 | 50.0 | 47.2 | 47.2 | 47.2 |
| $Al_2O_3$ | 33.0 | 31.5 | 31.5 | 31.5 | 33.3 | 31.5 | 31.5 | 31.5 |
| MgO | 14.6 | 13.9 | 13.9 | 13.9 | 14.7 | 13.9 | 13.9 | 13.9 |
| $As_2O_3$ | 1.5 | 3.7 | 3.7 | 3.7 | ------ | ------ | ------ | 3.7 |
| $Sb_2O_3$ | ------ | ------ | ------ | ------ | ------ | 2.0 | 3.7 | 3.7 |
| $Cs_2O$ | 1.4 | 3.7 | ------ | ------ | ------ | ------ | ------ | ------ |
| $Ta_2O_5$ | ------ | ------ | 3.7 | ------ | ------ | ------ | 3.7 | ------ |
| PbO | ------ | ------ | ------ | ------ | ------ | ------ | 3.7 | ------ |
| $K_2O$ | ------ | ------ | ------ | 3.7 | ------ | ------ | ------ | ------ |
| CaO | ------ | ------ | ------ | ------ | ------ | ------ | ------ | 3.7 |

|  | 9 | 10 | 11 | 12 | 13 | 14 | 15 |
|---|---|---|---|---|---|---|---|
| $SiO_2$ | 46.3 | 43.5 | 44.5 | 46.3 | 48.2 | 43.5 | 47.2 |
| $Al_2O_3$ | 32.7 | 33.3 | 30.1 | 30.8 | 30.8 | 37.0 | 31.5 |
| MgO | 13.6 | 15.8 | 18.0 | 15.5 | 13.6 | 12.1 | 13.9 |
| $Sb_2O_3$ | 3.7 | 3.7 | 3.7 | 3.7 | 3.7 | 3.7 | 3.7 |
| PbO | 3.7 | 3.7 | 3.7 | 3.7 | 3.7 | 3.7 | ------ |
| $Bi_2O_3$ | ------ | ------ | ------ | ------ | ------ | ------ | ------ |

Table II sets out the heat treatment to which each of the examples was subjected and records the appearance of the surface layer resulting from the particular heat treatment. Also tabulated are various physical properties which were obtained on several of the examples and measurements of the thickness of the surface layer based on 0.25″ square cross-section.

TABLE II

| No. | Heat Treatment | Sample Appearance | Exp. Coef. $\times 10^{-7}$/° C. (25–300° C.) | Mod. of Rupture (p.s.i.) | Thickness of Coating, mm. |
|---|---|---|---|---|---|
| 1 | 905° C.—10 hrs | Transparent coating | 33.3 | 44,810 | 0.05 |
| 2 | 930° C.—10 hrs | ----do---- | 32.7 | 51,660 | 0.04 |
| 3 | 890° C.—12 hrs | Translucent-opaque coating. | | 52,930 | |
| 4 | 905° C.—10 hrs | Transparent coating | | 44,094 | |
| 5 | 910° C.—12 hrs | Ivory-white opaque coating. | 32.0 | 32,390 | 0.45 |
| 6 | 910° C.—12 hrs | ----do---- | 29.5 | 37,960 | 0.40 |
| 7 | 910° C.—12 hrs | ----do---- | | 32,080 | |
| 8 | 900° C.—10 hrs | Translucent coating | | 37,940 | |
| 9 | 920° C.—10 hrs | Ivory; opaque coating | | | |
| 10 | 915° C.—12 hrs | ----do---- | | | |
| 11 | 920° C.—10 hrs | ----do---- | | | |
| 12 | 920° C.—10 hrs | ----do---- | | | |
| 13 | 920° C.—10 hrs | Ivory, opaque-translucent coating. | | | |
| 14 | 915° C.—12 hrs | Translucent-opaque coating. | | | |
| 15 | 930° C.—12 hrs | Ivory-white opaque coating. | 16.6 | 35,060 | 2.4 |

As can be seen from Table II, the appearance of the surface layer varies with the modifying and supplemental oxides used.

Where $As_2O_3$ and/or $Sb_2O_3$ are used alone as modifying agents, a translucent or opaque surface coating is produced. These agents raise the index of refraction of the glass so there is such a mismatch between the glass and the cordierite crystal layer a translucent or opaque coating results. Where the alkali metal oxides $K_2O$, $Rb_2O$, and $Cs_2O$ are added in conjunction with $As_2O_3$ and/or $Sb_2O_3$, a thin, transparent coating of good quality is obtained. These oxides lower the index of refraction of the glasses so a match of indices is essentially achieved between the surface layer and the adjacent glass.

Where PbO, CaO, $Bi_2O_3$ and $Ta_2O_5$ are the supplemental oxides, a thicker, translucent to opaque coating results. These oxides raise the index of refraction of the glass so there is sufficient mismatch between the glass and crystalline surface layer to produce an opaque coating. The tremendous increase in strength lent to the glass body by the encasing coatings will be appreciated when it is realized that the modulus of rupture of an untreated glass having a stoichiometry approximating that of cordierite normally ranges from 5000–6000 p.s.i. Thus, an increase in strength as much as tenfold is possible. The resistance to thermal shock of the untreated glass is also improved somewhat through surface coating, the coefficient of expansion of the untreated glass averaging about $36-38 \times 10^{-7}/^\circ$ C.

It is generally observed that the opaque surface layers are thicker than the transparent variety. This feature indicates a more rapid rate of crystallization which is of practical significance in that the problem of deformation during heat treating is reduced.

These cordierite coatings are quite hard, their Knoop hardness values averaging about 700.

As noted above, glasses near the cordierite stoichiometry are among the best insulators known. I have learned that the crystalline coatings of cordierite adversely affect, but do not destroy, the excellent dielectric properties of the glasses. Therefore, in the use of these encased glasses for electrical insulators (which may be the application most suitable for the products), the thickness of the surface layer is desirably kept as low as is consonant with insured strength. Furthermore, I have found that, while opaque layers are stable in relatively thick sections, the transparent types tend to spall when the coating thickness exceeds about 0.5 mm.

My invention, then, provides a method for manufacturing hard, smooth surface layers of cordierite crystals, which are reasonably uniform in thickness, on glass bodies having a composition approximating that of cordierite. These surface layers cause a compressive stress to be set up in and parallel to the surface of the base glass, thereby yielding a body of greatly enhanced physical strength. Because these coatings are relatively thin, the valued inherent properties of the untreated glass are substantially retained. The crystals themselves are quite fine, substantially all being smaller than 30 microns in diameter. Microscopic examination has revealed that the surface crystals constituting the transparent coatings are predominantly oriented with c-axes parallel to the glass surface, while those making up the opaque coatings are predominantly oriented with c-axes perpendicular to the glass surface. The theoretical refractive index of the transparent variety of coating is therefore higher than that of the opaque type and more nearly matches that of the glass. The products of my invention are eminently suitable for electrical insulators, missile components, and dinnerware.

It will be realized that although each of the above examples was shaped by pouring into steel molds, the invention is applicable to any of the conventional glass forming methods such as casting, pressing, rolling, or spinning.

FIGURE 1 records a time-temperature curve for the heat treatment of a specific example of the invention, viz., Example 1, wherein after the batch had been melted in an open crucible, shaped, and cooled to room temperature, the resulting glass body was heated at 5° C./minute to 905° C., maintained thereat for 10 hours, and then cooled at 5° C./minute to room temperature. The area enclosed within the dotted lines represents the preferred ranges of any process.

Figure 2:
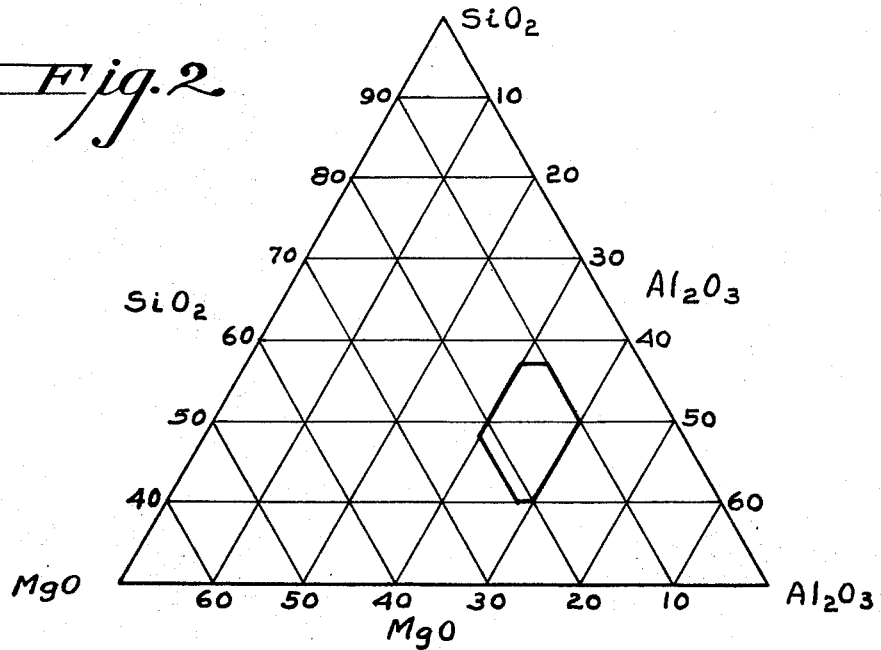

FIGURE 2 sets out the ranges of the ternary system $MgO \cdot Al_2O_3 \cdot SiO_2$ included in my invention.

What is claimed is:

1. A method of manufacturing a surface-crystallized glass body having a sound crystalline surface layer of cordierite crystals thereon comprising the steps of melting a glass-forming batch composition consisting essentially, by weight, of 40–57% $SiO_2$, 10–22% MgO, 30–40% $Al_2O_3$, 0.5–6% total of at least one modifying oxide selected from the group consisting of $As_2O_3$ and $Sb_2O_3$, and 0–6% total of at least one supplemental oxide selected from the group consisting of $K_2O$, $Rb_2O$, $Cs_2O$, PbO, CaO, $Bi_2O_3$, and $Ta_2O_5$, simultaneously cooling the melt below the transformation point of said melt and forming a glass shape therefrom, exposing said shape to a temperature of at least about 860° C., but not more than about 950° C., maintaining thereat for a time sufficient to attain surface crystallization, and thereafter cooling said shape to room temperature.

2. A method according to claim 1 wherein said time sufficient to attain the desired crystallization is 6–24 hours.

3. A method of manufacturing a surface-crystallized glass body having a sound crystalline surface layer of cordierite crystals thereon comprising the steps of melting a glass-forming batch composition consisting essentially, by weight, of 40–57% $SiO_2$, 10–22% MgO, and 30–40% $Al_2O_3$, 0.5–6% total of at least one modifying oxide selected from the group consisting of $As_2O_3$ and $Sb_2O_3$, and 0–6% total of at least one supplemental oxide selected from the group consisting of $K_2O$, $Rb_2O$, $Cs_2O$, PbO, CaO, $Bi_2O_3$, and $Ta_2O_5$, simultaneously cooling the melt below the transformation point of said melt and forming a glass shape therefrom, exposing said shape to a temperature range of 890°–930° C., maintaining thereat for 10–12 hours, and then cooling to room temperature.

4. A glass body having a sound crystalline surface layer of cordierite crystals thereon, said crystals resulting from crystallization in situ from a glass body formed from a batch composition consisting essentially, by weight, of 40–57% $SiO_2$, 10–22% MgO, and 30–40% $Al_2O_3$, 0.5 to 6% total of at least one modifying oxide selected from the group consisting of $As_2O_3$ and $Sb_2O_3$, and 0–6% total of at least one supplemental oxide selected from the group consisting of $K_2O$, $Rb_2O$, $Cs_2O$, PbO, CaO, $Bi_2O_3$, and $Ta_2O_5$, said glass body consisting essentially of the uncrystallized portion of the glass remaining after crystallization of said crystals.

5. A glass body having a crystalline surface layer thereon according to claim 4 wherein the amount added of the group of modifying oxides is 2–4% by weight.

6. A glass body having a crystalline surface layer thereon according to claim 4 wherein the amount added of the group of supplemental oxides is 2–4% by weight.

References Cited by the Examiner

UNITED STATES PATENTS 2,779,136  1/1957  Hood et al. _____ 106—39
2,920,971  1/1960  Stookey _____ 65—33 X DONALL H. SYLVESTER, *Primary Examiner.*

D. CRUPAIN, *Assistant Examiner.*